United States Patent Office 3,180,681
Patented Apr. 27, 1965

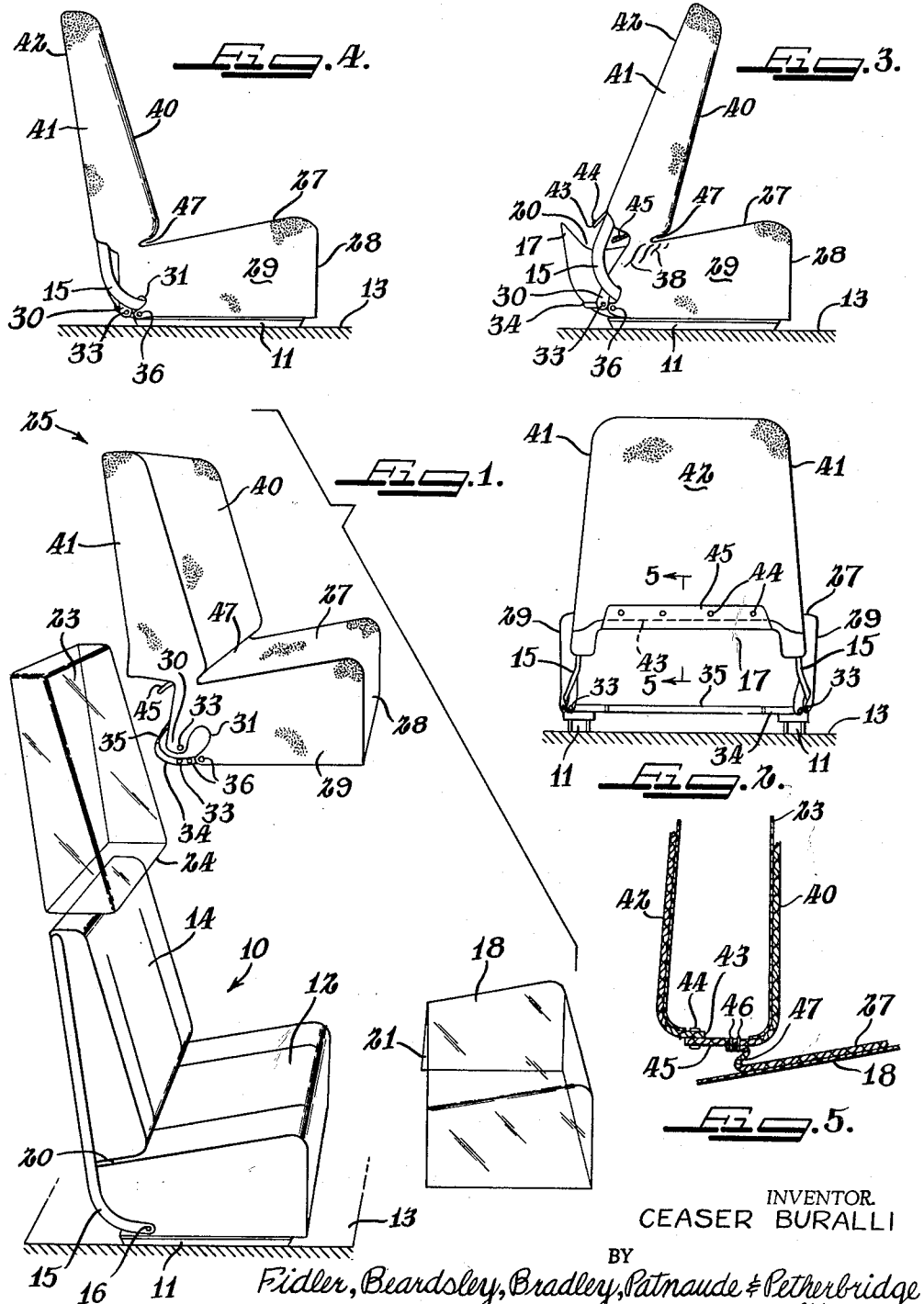

3,180,681
SEAT COVER FOR BUCKET SEATS
Ceaser Buralli, 6611 N. Rockwell, Chicago 45, Ill.
Filed Apr. 1, 1963, Ser. No. 269,426
4 Claims. (Cl. 297—224)

The present invention relates broadly to removable seat covers, and more particularly to seat covers for seats which have relatively movable seat and back-rest parts.

Bucket seats used for front seats in automobiles have bottom seat parts which are adjustable to accommodate drivers having different physical proportions. The back-rests of the seats are tilted between a rear-most position and a forward position whereby ready access is provided for occupants of rear seats upon entering and leaving the vehicle. Present seat covers for such bucket seats have failed to be both attractive and sufficiently flexible to fit snugly and permit tilting the back-rest part of a seat between its rear-most position in which the cover is preferably smooth and tight-fitting, and the forward tilted position in which at least part of the cover must flex substantially through a few inches to permit tilting. Many present seat covers tend to tear when a seat is tilted forward and then back when the occupant of the bucket seat moves backward, which movement places severe stress at those points of the seat cover adjacent rotatable parts of the seat.

There are different reasons of different car owners for the use of seat covers, but in main, cleanliness of the original upholstery and preservation thereof by prevention of scuffing, wear and staining are among those reasons most commonly entertained. Manufacturers provide plastic bags or pouches for seats to prevent damage and staining of same in normal handling and use prior to sale. Such pouches do not fit snugly and are uncomfortable, sometimes slippery, and accordingly, not conducive to a high degree of safety for general use. However, because such covers do inhibit soiling and are fluid impervious, many owners use them and replace them when they become torn or worn out.

Another reason why many owners use seat covers is for the purpose of decoration, and different colors are preferred at different times and by various persons. Hence, ready application and removal of seat covers is a further desideratum, in addition to nominal costs therefor. Other reasons for use of a given seat cover include ready cleanability, snugness of fit, durability, etc.

Accordingly, it is a broad object of the present invention to provide an improved seat cover for seats having relatively movable parts.

It is a further object, in keeping with the above object, to provide a seat cover for tiltable seats fabricated as a unit and having flexible portions adjacent rotatable parts of the seat to relieve stress and permit flexing of the cover without injury thereto.

It is a more specific object of the invention to provide a unitary seat cover of flexible fabric or the like, with fastening parts for securing the cover snugly with respect to seat parts while permitting flexing of same adjacent points of relative movement.

It is still a more specific object of the invention to provide a terry seat cover for fitting over seat parts, the same being washable or cleanable by well-known laundering and cleaning procedures.

A still further object of the invention is to provide fluid impervious covers that cooperate with the seat and the seat cover, which latter secures the impervious covers to seat parts.

The foregoing and other objects will become apparent in the following description and claims in view of the several figures of the drawing, in which:

FIG. 1 is an exploded perspective view of a seat, plastic undercovers and a seat cover, FIG. 2 is a rear view of a seat cover on a seat having its back-rest tilted forward, FIG. 3 is a side view with the back-rest in the position illustrated in FIG. 2, FIG. 4 is a side view, similar to FIG. 3, showing the covered seat in the position of normal occupancy, and FIG. 5 is a detail sectional view taken on line 5—5 of FIG. 2, but showing only cover parts.

The disclosure of the invention below is confined to bucket seats such as used in present-day automobiles and having a tiltable back-part with respect to the seat part of the bucket seat. It is within the scope of the invention to embrace seats having relatively movable parts, not necessarily being confined to the back-rest part, or to automobile seats.

An automobile seat 10 is supported upon one or more ways 11 secured to the automobile floor 13 whereupon the seat may be adjusted forwardly and backwardly, and up and down in some cases, as by structure provided by different automobile manufacturers to accommodate people of different physical proportions for comfortable operation of the controls and the steering wheel, not shown. The seat has a lower seat part 12 and a back-rest part 14, the latter of which is supported by a pair of support posts 15 attached as by pivots 16 to inner supports, not shown, within the seat portion 12. The back-rest part 14 of the seat is restrained in its rear-most position of movement by a bumper 17 (FIG. 3) and normally occupies this position during operation of the automobile.

The seat parts 12 and 14 are upholstered by the manufacturer with any of several materials, and it is usually desirable to maintain the quality of same for as long a time as conveniently possible. In order to prevent staining of same by liquid, I provide a liquid impervious covering bag 18 made of plastic material that is formed to fit over the top of the seat part 12 and embrace the front and sides thereof to cover same with a liquid impervious cover. The seats normally have a space 20 between the seat parts 12 and 14 and the cover 18 is adapted to have its rear top edge 21 extend into this space adjacent the bumper 17 (FIG. 3) whereby to substantially completely cover the top, sides, and front of the seat part 12. A liquid impervious bag 23 has an open bottom 24 so that same may be slipped down over back-rest part 14 of the seat 10. The edges of the bag adjacent the open-bottom 24 can be placed into the space 20 to substantially completely cover the exposed surfaces of the back-rest 14 to prevent staining thereof by liquids and the like. Such bags 18 and 23 are presently provided by some automobile manufacturers, and are also available from other commercial sources.

To secure the bags 18 and 23 to the seat parts 12 and 14, respectively, a seat cover 25 is provided. It is to be understood, however, that the seat cover 25 can be used with or without the impervious bags 18 and 23. It is desired, when the seat cover 25 is fabricated of terry or the like, that impervious bags be used because liquids easily penetrate the fabric. Terry, on the other hand, has several advantages over prior plastic, or the like, seat covers in that it can closely and snugly fit a seat. In addition, it is designed according to this invention to be readily removable so that it can be laundered or cleaned by well-known processes.

The seat cover 25 is formed of a seat covering panel 27 connected with material forming a front panel 28 and opposite side panels 29. Only the right-hand panel 29 is shown in the figures of the drawing, it being understood that the left-hand panel is substantially identical to it, but opposite hand. The side panels 29 have tabs 30 formed by notches 31 at their lower rear corners, and it is preferred that these notches 31 be reinforced at their edges. Notches 31, as most clearly shown in FIGS. 3 and 4, surround and provide clearance for the support posts 15 for the back-rest portion 14. The tab 30 has a snap 33, or eyelet, or the like, to which a strap 34 may be readily connected, which strap passes around the rear of the seat. The strap 34 is preferably further provided with an elastic section 35 to hold the seat part 25 firmly. The elastic section is preferably provided with nap or other friction surface to frictionally engage the seat back. A snap 36, or eyelet, or the like, on the rear bottom corner of the notch 31 is snapped to the strap 34. As more clearly shown in FIGS. 3 and 4, the notch 31 surrounds posts 15 to secure the seat panel 27, front panel 28 and side panels 29 of the seat cover 25 in position. The flexible part 35 of the strap 34 permits some movement and wrinkling 38 of that portion of the side panels 29 adjacent the rear of the seat cover panel 27.

Attached to the top panel 27 and side panel 29, are back-rest cover front panels 40 and side panels 41 which may be sewn thereto, or otherwise suitably secured. The front 40 and side panels 42 of the back-rest covering part of the seat cover 25 are attached to a back panel 42 which at its lower edge 43 has snaps 44. Attached, as by sewing to the inside of the front panel 40, is a flap 45 provided with mating snap parts that engage snaps 44 as most clearly shown in FIGS. 2 and 5. The bottom edge 43 of back panel 42 is pulled down to the bottom of the back-rest and folded into the clearance 20 which is quite large with the back-rest tilted as shown in FIG. 3. The flap 45 is then drawn backwardly to form a tuck 47 between the seat top panel 27 and back-rest front panel 40. This operation can conveniently be performed with the parts in the position shown in FIG. 3. The snaps 44 can then be engaged and the back-rest cover portion of the seat cover 25 will become snugly secured in position. The back-rest covering plastic bag 23 when used will also be snugly secured between the seat cover and the back-rest part 14 of the seat. Back-rest portion 40 of the seat can then be pushed to the position shown in FIG. 4, and the lower seat covering part of the seat cover can be pulled backwardly and the snaps 33 and 36 connected with the straps 34.

With the seat cover thus attached, the seat can be rotated between the position shown in FIG. 4 and FIG. 3 and the flexible innerconnection between the back-rest part and the seat part will yield as indicated by wrinkles 38. It is considered obvious that even though the seat covers be made of different material than terry, that such wrinkling would be permitted and accordingly, the stress on parts adjacent the position of rotation of relatively rotatable parts is kept at a minimum. Accordingly, impervious materials can be incorporated in fabrication of the seat cover 25 to afford this advantageous feature thereto.

Quick and simple removal and replacement of the seat cover 25 is also a novel attribute of this invention. The back-rest is tilted forward and the above mentioned snaps 44 disengaged to free the back-rest portion of the seat cover. Snaps 33 and 36 are disengaged to free the seat-part portion of the seat cover 25 and clear the posts 15. The unitary seat cover can then be lifted upwardly and off both seat parts 12 and 14. To replace same, the parts are slipped over the seat parts 14 and 12 and the snaps re-engaged.

While I have shown in detail and described one preferred modification of the invention and the manner in which same is to be used, it will be understood that obvious modifications will occur to those skilled in the art. Accordingly, I am not to be limited in my invention to the specific details disclosed above, but by the scope of the following claims.

I claim:
1. A seat cover for a seat of the kind including a bottom portion having sides of a given thickness and a tiltable back rest portion pivotally carried by said bottom portion on support posts mounted for rotation around connections adjacent said sides and spaced downwardly from the top and forwardly of the rear of the bottom portion of the seat; said seat cover comprising two pouches having a flexible common portion positioned between said pouches, said common portion being spaced above said rotatable connections when said cover is mounted on said seat, one said pouch covering substantially the entire back rest portion of said seat, the other said pouch covering most of the top and front and sides of the bottom portion of said seat, said other of said pouches having notches on its sides adjacent said connections wherein the support posts may move, said notches forming downwardly facing tabs at the rear of said support posts, said tabs having fastening means thereon, fastening means on corners of the notches forwardly of the support posts, an elastic strap extending across the back of the bottom portion of said seat and having a plurality of fastening means thereon mating with the fastening means on said tabs and said corners for securing the notched portion around the support posts and permitting parts of the one said pouch, parts of said sides of the other said pouch, and said common portion to stretch and contract when the support posts are rotated about the connections, whereby the seat cover will be maintained in a tightly fitted condition at all times in any position of said seat.

2. A seat cover substantially as set forth in claim 1, said one pouch having a pair of depending flaps extending below the bottom of the back rest portion, and a plurality of cooperable snap fasteners on said flaps for securing same together.

3. A seat cover substantially as set forth in claim 1, in which said fastening means on said tabs, corners, and said elastic strap are snap fasteners.

4. A seat cover substantially as set forth in claim 1, in which the elastic strap has a plurality of snap fasteners thereon, to be selectively engaged by the mating fasteners on the tabs and corners for varying degrees of tightness of said covers.

References Cited by the Examiner
UNITED STATES PATENTS

| 1,817,404 | 8/31 | Whaley | 297—225 |
| 1,861,455 | 6/32 | Schwartz | 297—224 |
| 2,091,825 | 8/37 | Mednick | 297—224 |
| 2,202,065 | 5/40 | Peebles | 297—220 |
| 2,228,948 | 1/41 | Field | 297—229 |
| 2,229,160 | 1/41 | Wittcoff | 297—219 |
| 2,516,363 | 7/50 | Block et al. | 297—219 |
| 2,563,203 | 8/51 | Yerby | 297—219 |
| 2,575,548 | 11/51 | Carter et al. | 297—219 |
| 2,587,128 | 2/52 | Eull | 297—219 |
| 2,904,103 | 9/59 | Nail | 297—224 |

FOREIGN PATENTS

| 212,729 | 1/61 | Austria. |
| 719,329 | 12/54 | Great Britain. |
| 1,094,163 | 12/54 | France. |

FRANK B. SHERRY, *Primary Examiner.*